United States Patent [19]

Tanabe et al.

[11] Patent Number: 5,129,046
[45] Date of Patent: Jul. 7, 1992

[54] METHOD FOR AUTOMATICALLY CONVERTING A DATA FLOW DESCRIPTION OF A SOURCE PROGRAM DIRECTLY INTO A FUNCTION DESIGN CHART

[75] Inventors: Shiro Tanabe, Hachioji; Taihei Suzuki, Kodaira; Yukihito Maejima, Hachioji; Mituyuki Masui, Yokosuka, all of Japan

[73] Assignee: Hitachi, Ltd., Tokyo, Japan

[21] Appl. No.: 386,198

[22] Filed: Jul. 28, 1989

[30] Foreign Application Priority Data

Jul. 29, 1988 [JP] Japan ............................ 63-188412

[51] Int. Cl.⁵ .............................................. G06F 15/20
[52] U.S. Cl. ................................. 395/100; 364/977.1; 364/516; 364/DIG. 2; 364/191
[58] Field of Search ... 364/188, 191, 192, 200 MS File, 364/900 MS File; 395/100

[56] References Cited

U.S. PATENT DOCUMENTS 4,315,315  2/1982  Kossiakoff ..................... 364/518
4,725,975  2/1988  Sasaki ............................ 364/900

Primary Examiner—Thomas C. Lee
Assistant Examiner—Paul Harrity
Attorney, Agent, or Firm—Antonelli, Terry, Stout & Kraus

[57] ABSTRACT

A method of converting with the aid of a computer a data flow description chart containing a plurality of process elements each receiving a plurality of inputs and outputting one or plural data according to the result of processing and data lines interconnecting the plural process elements into a function design chart showing an outline of the data flow. A source program list corresponding to the data flow description chart is inputted to the computer. A statements analyzing program then consults a first description rule table prepared previously to thereby convert each statement of the source program describing the relation between each of the process elements and the plural input information inputted to each process element into an output data record including a graphic symbol to be displayed on the function design chart and comment. The comment imparted to each graphic symbol of the process element is the respresentative input information of those inputted to the process element. When the input information originates in other process element, a second description rule table prepared previously is then referred to for searching the source process element in which the input information originates. The name of the inherent information found as the result of the search constitutes the comment. Each output data record is added with linkage information between the process elements in consideration of the representative data governing the execution of each process element. A drawing program draws the function design chart on the basis of the output data records.

3 Claims, 15 Drawing Sheets

FIG. 3

| | 12A | 12B | 12C | | INPUT INFORMATION | | | | |
|---|---|---|---|---|---|---|---|---|---|
| | PROCESS ELEMENT NO. | PROCESS ELEMENT NAME | | LIM.FLG1.RRG | LIM.FLG1.ATT | LIM.ML | LIM.MV | LIM.BC4.CWVC; |
| 121 | 001 | SLCPKT | *-* | | | | | LIM.BC4.CWVC; |
| 122 | 002 | EQ | 0 | 1-5; | | | | |
| 123 | 003 | CALL | ASPCHK *4-0; | 1-1 | 1-2 | 1-3 | | |
| 124 | 004 | MSEND | SFF *2-1; | 0 | 0 | | 1-7 | IDL |
| 125 | 005 | EQ | 1 *3-0,3-1; | 1-4 | | | | |
| 126 | 006 | MSEND | SFF *5-1; | 0 | 0 | S7F02 | 1-8 | CLF |
| 127 | 007 | BISW | 1-3 *5-0; | LIM.FLG1.RRG0 | | | | |
| 128 | 008 | UTMRH | 0 | CFR | 1-1; | | | |
| 129 | 009 | BYSW | 1-3 *5-0,6-0; | LIM.STN0 | 13 | | | |

| PROCESS ELEMENT (181) | SYMBOL AND COMMENTS (189) |
|---|---|
| EQ | (189A) EQ triangle with 0, 1; (189B) IN0 = IN1 |
| MSEND | IN5 / IN3 |
| ⋮ | ⋮ |
| SLCPKT | — |

| PROCESS ELEMENT NAME (181) | FLAG (182) | DESCRIPTION INFORMATION | | |
|---|---|---|---|---|
| | | TYPE OF SYMBOL (183) | SYMBOL NAME (184) | COMMENT (185) |
| EQ | 1 | 2 | EQ | (IN0) = (IN1) |
| MSEND | 1 | 3 | (IN5) | (IN3) |
| ⋮ | | | | |
| SLCPK | 0 | 0 | 0 | 0 |

FIG. 7

| PROCESS ELEMENT NAME | SERVICE INFORMATION | | | | | | | |
|---|---|---|---|---|---|---|---|---|
| | OUT 0 | OUT 1 | OUT 2 | OUT 3 | OUT 4 | OUT 5 | ---- | OUT 8 |
| EQ | (IN0) | (IN0) | O | O | O | O | ---- | O |
| MSEND | (IN3) | O | O | O | O | O | ---- | O |
| ---- | | | | | | | | |
| SLCPKT | PKT | A | O | TRM | (IN1) | (IN2) | ---- | (IN5) |

| LINKAGE | | TYPE OF SYMBOL | NAME OF SYMBOL | COMMENT | ELEMENT NO. |
|---|---|---|---|---|---|
| OUT:0 | OUT:1 | | | | |
| 2 | 8 | 0 | "START" | | 0 |
| 3 | 4 | 2 | "EQ" | "0=LIM·FLG1·ATT" | 2 |
| 5 | 5 | 5 | "ASPCHK" | "SUP CALL CHECK" | 3 |
| 3 | | 3 | "IDL" | | 4 |
| 7 | 6 | 2 | "EQ" | "LIM·ML" | 5 |
| 9 | | 3 | "CLF" | "1=LIM·FLG1·RRG" | 6 |
| 1 | | 6 | "LIM·FLG1·REG" | "S7F02" | 7 |
| 1 | | 7 | "CFR" | | 8 |
| 10 | | 1 | "LIM·STNO=13" | | 9 |
| 1 | | 10 | "END" | | 10 |

200A 200 200B 203 204 205 201

| STATEMENT | LINE NO. |
|---|---|
| PKTPTR=PKTR; | 001 |
| AA=PKT.PN; | 002 |
| IF AA=0 | 003 |
| THEN | 004 |
| BB=AA+1; | 005 |
| PKT.PN=BB; | 006 |
| ELSE | 007 |
| BB=AA-1; | 008 |
| PKT.PN=BB; | 009 |

METHOD FOR AUTOMATICALLY CONVERTING A DATA FLOW DESCRIPTION OF A SOURCE PROGRAM DIRECTLY INTO A FUNCTION DESIGN CHART

BACKGROUND OF THE INVENTION

1. Field of the Invention

The present invention generally relates to a method and a system for generating a function design chart. More particularly, the invention is concerned with a method and a system for converting or translating with the aid of a computer a data flow description expressed in terms of plural process elements and data lines interconnecting the process elements to a function design chart showing an outline of the processing (i.e. major processing functions).

2. Description of the Related Art

As a system for automatically generating a flow chart from a source program, there is known, for example, a SEWB (an abbreviation of Software Engineering Work Bench) system reported "Concept and Functions of SEWB" "HITACHI REVIEW", Vol. 70, No. 2, pp. 7-14 (Feb., 1988). The SEWB system incorporates a function for converting or translating a procedure language such as FORTRAN, PL/1 or the like into a problem analysis diagram (also referred to simply as PAD). A statement of the source program is described as one process box in the PAD chart obtained as the output of the SEWB system, that is placed at a corresponding position on a detailed design document assuming the form of the PAD chart.

For more particulars, reference is made to FIG. 18 of the accompanying drawings. When a source program 80 described in the PL/I and containing the statements labeled line Nos. 001 to 009 is inputted to the SEWB system, the latter then outputs a detailed design document containing individual process boxes 81 to 89 in the form of a PAD chart, wherein a process box 8N corresponds to a statement 00N (where N represents a number of 1 to 9) of the source program 80.

In this conjunction, when a function design chart showing only the outline of processing is to be obtained from the source program 80 in the form in which procedure statements of work data or the like (e.g. statement of line No. 002) is eliminated, there may be conceived such methods as described below.

As a first method, steps of a source program are chosen and designated as to whether or not the step is the object for description of the function design chart for every step, Wherein only the steps designated as the object for description are converted to the process boxes. By way of example, the steps for write and decision processes (e.g. statements identified by the line Nos. 003, 006 and 009 in FIG. 18) are designated as the object for description while the other statements are designated as being not the object for description.

According to this method, the source program 80 is converted to a function design chart containing three process blocks 91 to 93 corresponding to the statements 003, 006 and 009, respectively, as shown in FIG. 20. It is however noted that in the function design chart obtained according to this method, the process box 91 has a variable AA while the process boxes 92 and 93 branched from this decision box have the same contents, respectively, representing a defect which makes the function design chart unusable for practical applications.

For eliminating the defect mentioned above, it is required that when a process statement to be described (or alternatively a label attached to a corresponding process box on the function design chart) includes a variable as the program work data, the variable is replaced by the name of data or field in which the variable is placed, to thereby display in such a manner as shown in FIG. 21. However, when such translation for the display is to be effectuated in a program described in a procedure language, it is necessary to search where the variable AA used in the statement 003 is placed by tracing back the flow of execution of the program. For realizing the tracing-back search mentioned above, the source program must actually be made to run with all the branching conditions being taken into consideration. This involves an indispensably enormous amount of consumption in machine time.

SUMMARY OF THE INVENTION

An object of the present invention is to provide a function design chart generating method and system capable of generating or outputting a function design chart showing an outline of the functions of a data flow description chart expressed in the form of individual process elements linked or interconnected by data lines on the basis of an inputted source program corresponding to the data flow description chart without any need to actually run the source program.

For achieving the above object, it is taught according to a general aspect of the present invention to use first and second description rule tables for converting or translating the process elements on the data flow description chart into descriptions on the function design chart.

The first description rule table contains in correspondence to the individual process elements used in the data flow description chart definitions of flag information indicating whether or not the process elements of the data flow description chart are the object for description of the function design chart, and information required for the description of the function design chart for those process elements which are the object for description of the function design chart such as information concerning the types of graphic symbols, names thereof and comment information.

The second description rule table defines in correspondence to the individual process elements the information for converting the symbol name and the comment information defined in the first description rule table mentioned above to more concrete comment information which conforms substantially to the data flow description chart mentioned above.

According to the present invention, the individual program steps (statements) of a source program list are decided sequentially as to whether or not the process elements constituting the objects for description of the function design chart are contained or not by consulting the first description rule table. When the statement of concerns is of the process element to be described on the function design chart, the process element identification number (or statement identification number) and the description information defined in the first description rule table are written in a work area as an output record. This is then followed by replacement of the comment information contained in the abovementioned description information by comment information having more concrete contents.

Each of the process elements constituting parts of the data flow description chart receives a plurality of fixed value or variable data inputs and generates one or plural outputs in accordance with the result of the processing. Each of the statements of the source program assumes such a form in which the name of the process element is described together with the information inputted to the process element in the order of the input positions. The input information is represented by a fixed value, variable or a symbol specifying the output position of other process element.

According to the present invention, the first description rule table shows the comment information to be affixed to each process element in the form of the input position of the abovementioned input information, by way of example. On the other hand, the second description rule table stores as the available information the output data of each process element in the form of numerical values, variable names or information from other process element in the form of the input positions.

As the comment information to be added to the process element which is to be described in the function design chart, the input information is adopted which is described in the source program list and corresponds to the input position of the input information defined by the first description rule. When this input information is the data input supplied from other process element at a predetermined output position thereof, the second description rule is applied to the process element in which the input data originates for thereby adopting as the abovementioned comment information the value or name of the output data corresponding to the predetermined output position mentioned above. At that time, if the supplied information (output data) defined by the second description rule is the data input originating in still another process element on the data flow description chart, the application of the second description rule is repeated until the supplied information is traced back to the fixed input information.

In this manner, output data records are prepared in the work area for all the process elements which constitute the objects for description of the function design chart. These output records are added with linkage information for indicating interconnection (linkage) relations with the process elements defined by other data records on the basis of the relations with other process elements described in the source program.

According to the present invention, the data conversion processing described above is performed by a statements analyzing program, wherein a drawing program outputs the function design chart on the basis of the output data records as obtained. The drawing program has basic graphic symbol data prepared in accordance with the types of the process elements and draws the function design chart including a plurality of basic graphic symbols disposed in accordance with the interconnection relations among the process elements indicated by the linkage information and added with the comment information indicated by the output data records, respectively.

In order to generate a simplified function design chart by limiting the data lines among the process elements described on the function design chart to particular ones selected from the data lines on the data flow description chart, the source program list is processed by a data line optimizing algorithm (program) to be converted to a modified source program list including the statements containing specific marks affixed to the information which is the object for the linkage or interconnection to other process elements. The modified source program list is then processed by the statements analyzing program mentioned above. In that case, the linkage information is imparted to the output data by taking into account only the input information having the specific mark.

The foregoing and other objects, advantages, manner of operation and novel features of the present invention will be understood more clearly from the following detailed description when read in connection with the accompanying drawings.

BRIEF DESCRIPTION OF THE DRAWINGS

FIG. 3 is a view showing an example of a source program list corresponding to the data flow description chart shown in FIG. 2;

FIG. 5 is a view for explaining first description rules;

FIG. 6 is a view showing a structure of a first table storing the first description rules;

FIG. 7 is a view showing a structure of a second table for storing second description rules;

FIG. 9 is a view showing, by way of example, data for a function design chart obtained as the result of execution of the statements analyzing program shown in FIG. 8;

DESCRIPTION OF THE PREFERRED EMBODIMENTS

Figure 1:
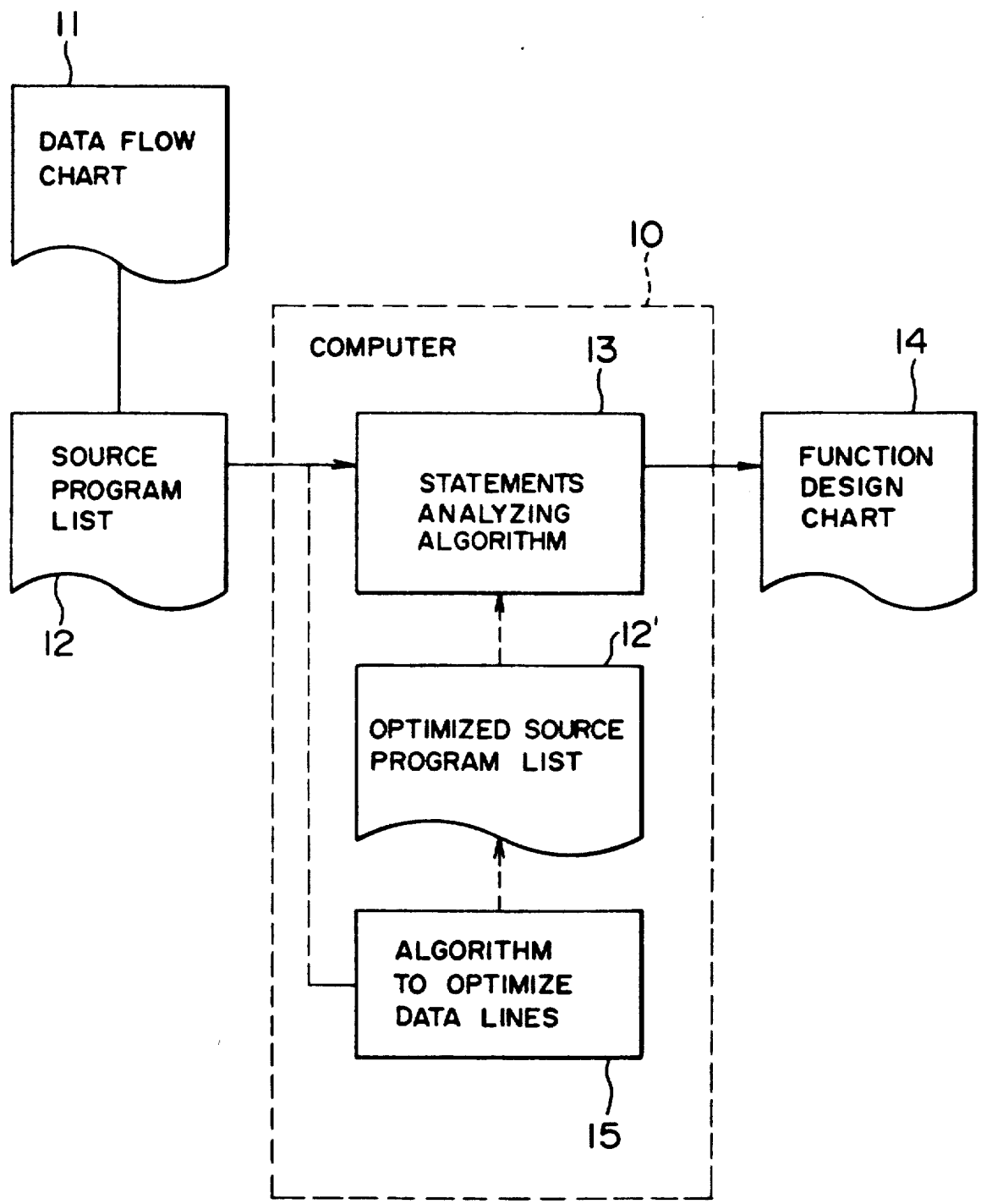
FIG. 1 is a schematic diagram for illustrating the concept underlying the function design chart generating method according to an embodiment of the present invention.

FIG. 1 is a schematic diagram for illustrating the concept underlying a function design chart generating system (a sort of design supporting system) to which the present invention is applied. According to the invention, a source program list 12 prepared in one-to-one correspondence relation with a data flow description chart 11 is inputted to a computer 10 where the contents of the source program list are analyzed with the aid of statements analyzing algorithm 13 incorporated in the computer, whereby the source program list is transformed into a function design chart 14 indicating an outline of the functions of the source program.

Figure 2:
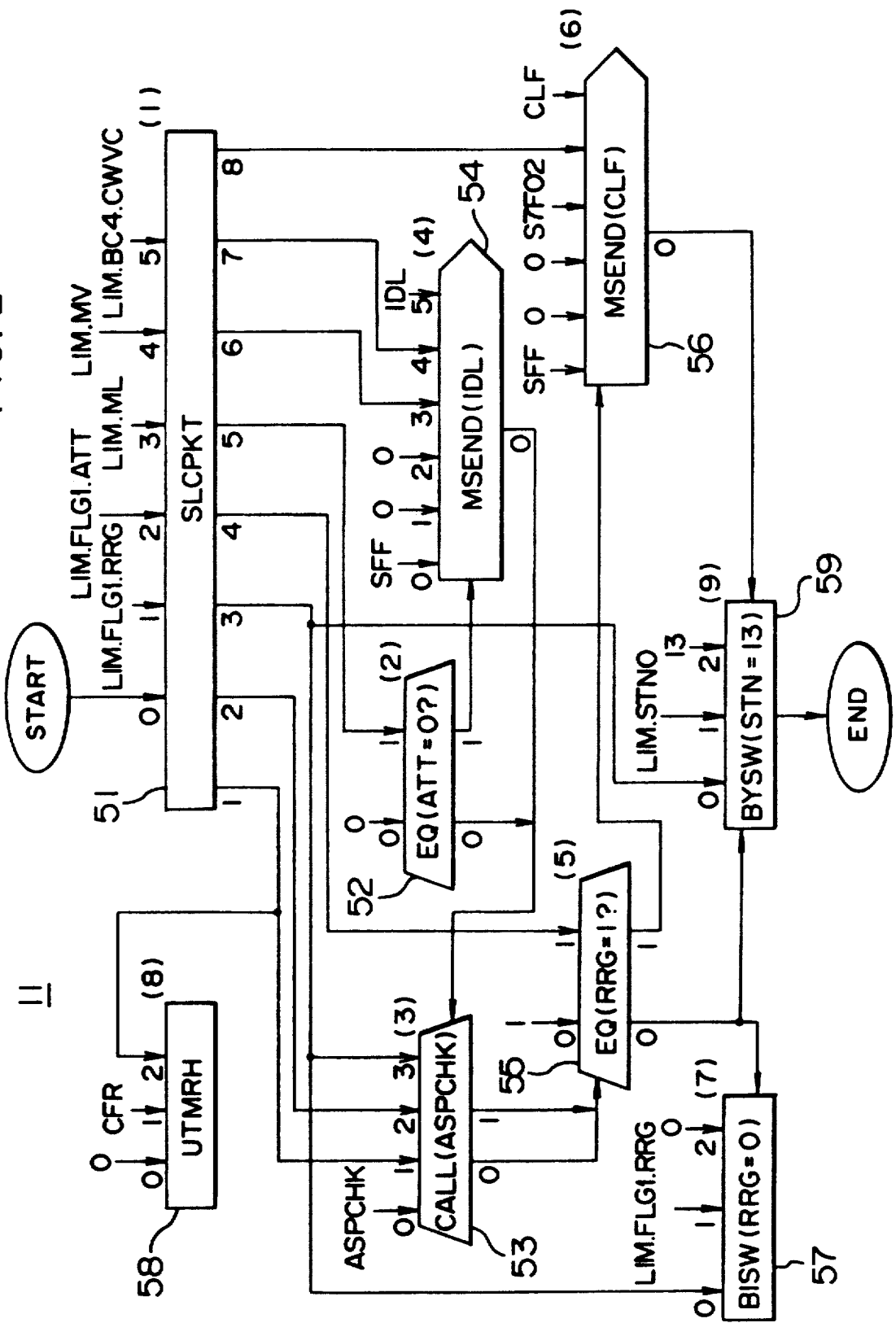
FIG. 2 is a view showing a typical example of a data flow description chart.

The data flow description chart 11 expresses the program functions in the form of graphic symbols 51 to 59 each of which represents a process element and which are interconnected by arrow-headed lines indicating the flows of data, as is illustrated in FIG. 2, only by way of example. Referring to this figure, the inputs to a process element may include fixed inputs having fixed values such as, for example, the input "0" at an input position 0 of a block or process element (or box) 58 and "CFR" at an input position 1, a data input from other process element such as, for example, the input at an input position 1 of the block or process element 52 and dummy data shown as being inputted to a lateral side of a block for prescribing the sequence of execution of a process by the relevant process element, as exemplified by the input to a block 54 from block 52.

FIG. 3 shows a structure of a source list containing a plurality of statements 121 to 129 assigned with process element numbers 12A in correspondence with graphic symbol numbers (1) to (9) of the blocks or graphic symbols 51 to 59, respectively, shown in the data flow description chart 11 described above. Each statement includes the process element number 12A, a process element name 12B and input information 12C. The input information 12C in turn includes fixed value inputs and data inputs in the order of the input positions (corresponding to the input positions 0, 1, . . . , in each block or graphic symbol shown in FIG. 2), wherein the fixed value input is expressed by the numeral indicating the input value while each of the data inputs is expressed by a combination of the process element number assigned to the process element constituting a data generating source (in which the input data originates) and a numeral indicating an output position, the combination being expressed by an interlink line "-". By taking as example the statement 128 assigned with the process element number "008" corresponding to the process element block 58 shown in FIG. 2, this statement 128 is described in terms of a fixed value of "0" at the input position 0, a fixed value "CFR" at the input position 1, and "1—1" at the input position 2 which indicates the data sent from the output position 1 of the block or graphic symbol 51 having the process element number 1 (process element name "SLCPKT"). Incidentally, a symbol ";" indicates the end of description of each statement.

For generating or creating a much simplified function design chart by limiting the expression of data lines between the process elements (also referred to as inter-element lines) described on the function design chart only to those particular data lines which govern the conditions for activation of the individual process elements, the source program list 12 is processed by a data line optimizing program 15 (FIG. 1) to thereby generate an optimized source program list 12' in which particular ones of the input information contained in the statement are affixed with predetermined identification marks, whereon the optimized source program list 12' is processed by the statements analyzing program 13. In this way, only the input information affixed with the identification marks is given to the output data record as the linkage information of the objects for the linkage, whereby, the number of the inter-element data lines can be decreased correspondingly.

Figure 4:
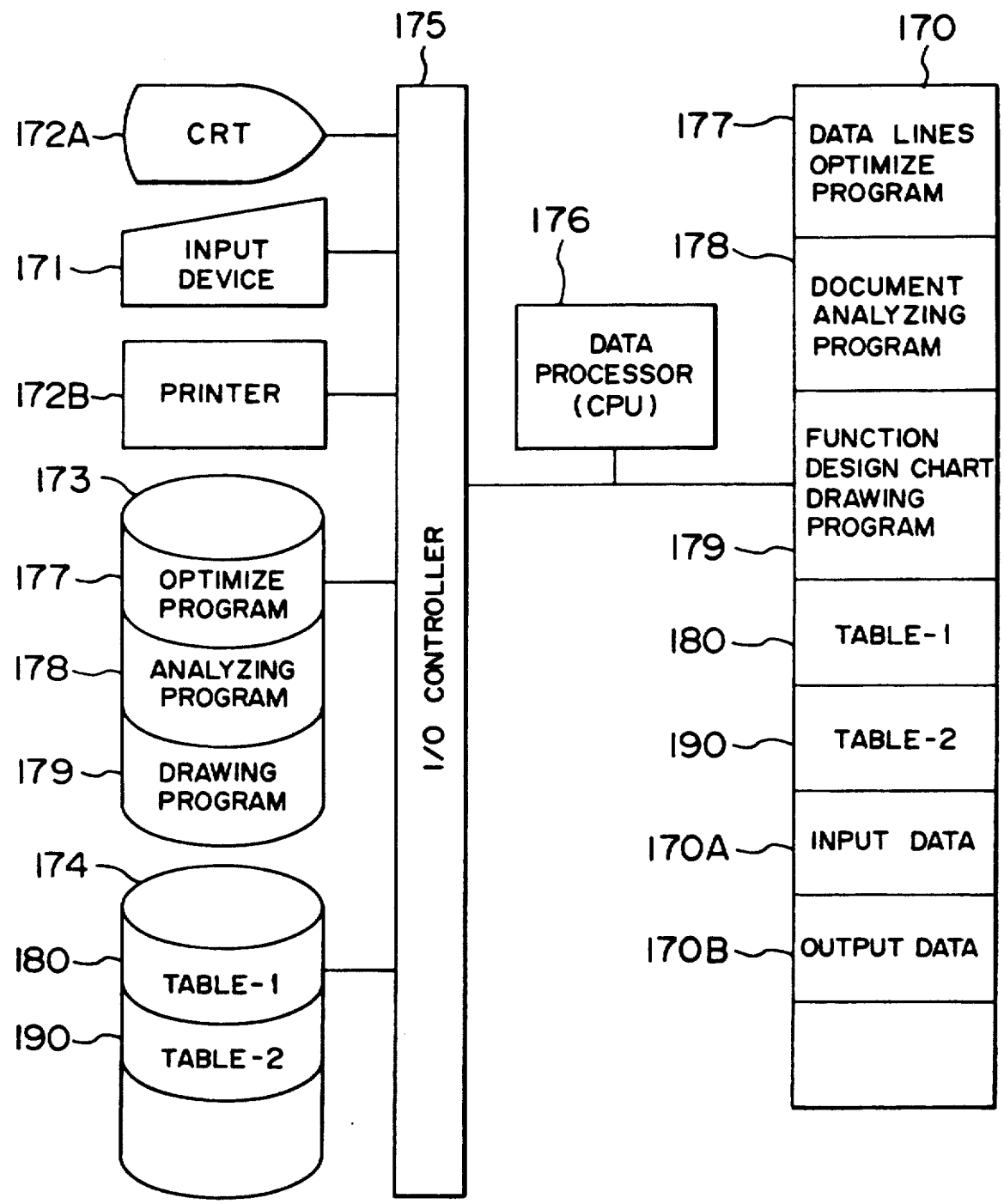
FIG. 4 is a schematic block diagram showing a general arrangement of a system for carrying out the present invention.

FIG. 4 shows a general arrangement of a function design chart generating system according to an embodiment of the present invention. In the figure, a reference numeral 171 denotes an input device for inputting the source program list 12 described above and operation commands, a numeral 172A denotes a display (CRT), a numeral 172B denotes a printer, a numeral 173 denotes disc equipment for storing a data line optimizing program 177, statements analyzing program 178 and a drawing program 179, and a numeral 174 denotes disc equipment for storing a first table 180 containing for every process element first rules of description defining whether or not the process elements can be the objects for description on the function design chart and a second table 190 containing for every process element second description rules defining service information which is to be described in the function design chart. Further, a reference 175 denotes an I/O controller serving as an interface between the various input/output (I/O) devices mentioned above and a data process or (CPU) 176, and a numeral 170 denotes generally a memory for storing the data line optimizing program 177, the statements analyzing program 178, the drawing program 179 and the first and second tables 180 and 190 read out from the disc storages 173 and 174. The source program 12 is inputted through the input device 171 and is stored in the input data area 170A in the abovementioned memory 170 in the form of a character code, e.g. EBCDIC code.

The statements analyzing program 178 analyzes the input source program 12 stored at the input data area or the source program 12' undergone the data optimizing process mentioned previously to thereby translate or convert the source program into data records corresponding to the graphic symbols used for describing the function design chart. The results of the conversion are written in the memory 170 at an output data area 170B. The function design chart drawing program 179 reads out the data records for the function chart from the abovementioned output data area 177B for executing a graphic symbol edit processing and a layout processing, wherein the results of the processings performed by the drawing program are outputted to the output device 172A and/or 172B as the function design chart.

The first table 180 defines description information 189 (graphic patterns 189A and comments 189B) to be expressed on the function design chart in correspondence with the process elements, respectively, as shown in FIG. 5. The structure of a first table storing the storing the first description rules of FIG. 5 is shown in FIG. 6. More specifically, the first table 180 contains for all the process elements used in describing the data flow chart 11 the process element names 181, flags 182 and the description information 189. The latter in turn includes information concerning types of graphic symbols 183, symbol names 184 and comments 185, as can be seen in FIG. 6.

The flag 182 indicates whether or not the associated process element is the object for description in the function design chart. If so, the flag is set to "1". The graphic symbol type information area 183 stores therein the geometrical configurations (e.g. rectangle, triangle or other) of the process element boxes to be expressed on the function design chart. The symbol name area 184 stores the names to be displayed within the graphic symbols (process element boxes). The comment area 185 stores additional information to be displayed in juxtaposition with the graphic symbols. On the other hand, the second table 190 stores therein the process element names 191 and service information denoted collectively by 199 (and individually by 192 to 198) and designated in correspondence to the output positions (OUTn), as shown in FIG. 7. In conjunction with the comments 185 and the symbol names 184 in the first table 180 and the service information 199 in the second table 190, the input information to the individual process elements are designated by "INn", respectively, wherein n represents the input position.

In operation, when an operator inputs a function design chart generating request command in succession to the inputting of the source program 12, the data processor (CPU) 176 reads out the data optimizing program 177, the statements analyzing program 178 and the drawing program 179 from the program file or data disc storage 173 while reading out the first table 180 and the second table 190 from the data file or disc storage 174 and loads them in the main memory 170, whereon the statements analyzing program 178 is activated.

Figure 8:
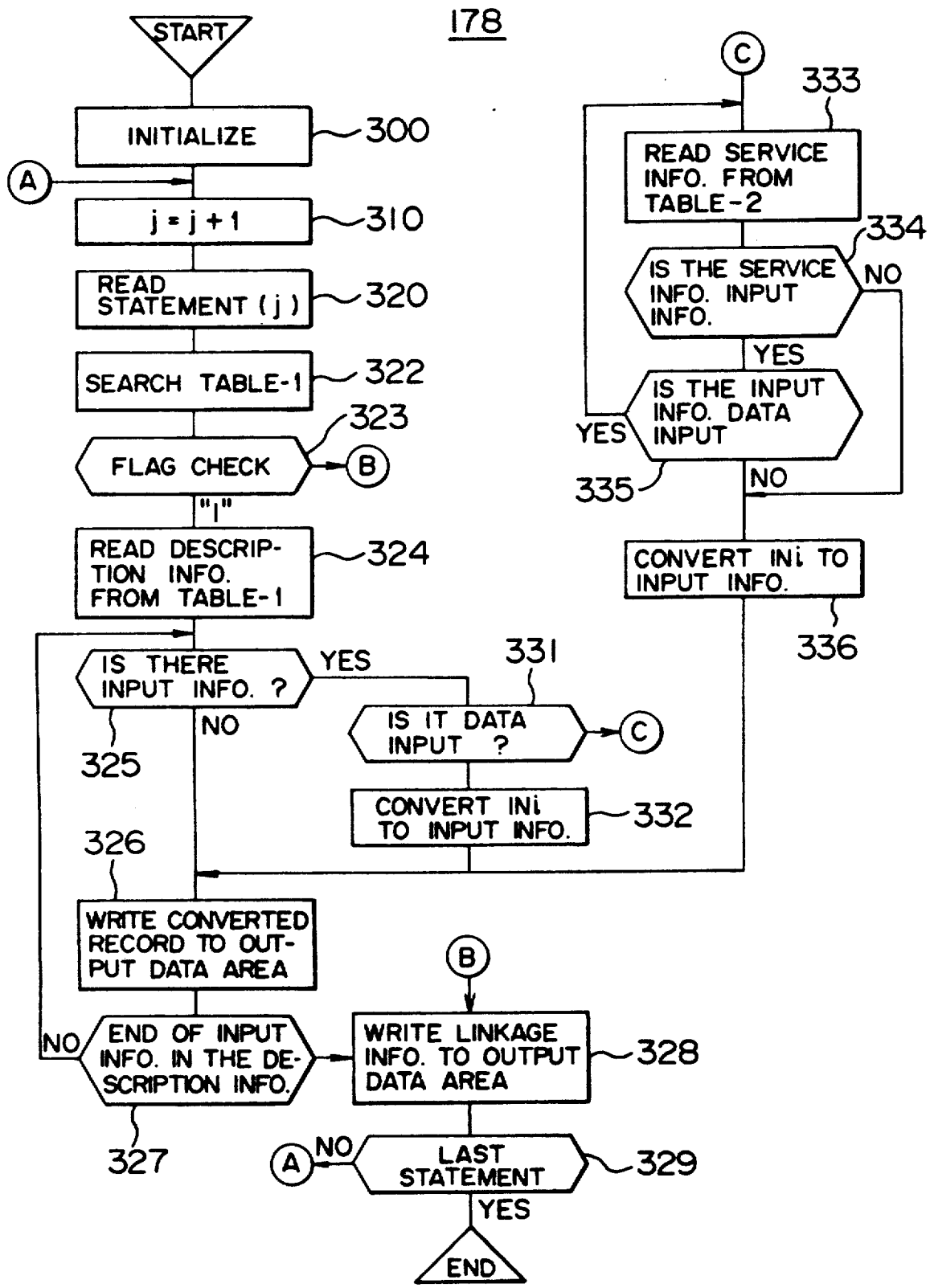
FIG. 8 is a view showing a statements analyzing program in a flow chart.

In the following, description will be made of algorithm of the statements analyzing program 178 by referring to FIG. 8.

At a first step 300, the statements analyzing program 178 initializes parameters j designating the statements to be read out for reading out these statements (121 to 129) in the order of the process element numbers 12A in the input source program 12 (FIG. 3). The parameter j is then incremented by "1" (step 310).

Subsequently, the j-th statement is read out from the input data area 177A of the memory 170 at a step 320, and a first table record having the same process element name as the process element name 12B included in the j-th statement is searched from the first table 180 (TABLE-1) at a step 322. Next, the flag 182 of the first table record mentioned above is checked at a step 323. The flag 182 indicates whether the process element of concern is to be described on the function design chart (FLAG="1") or not (FLAG="0"). In the case of the source program shown in FIG. 3, it is assumed that the flags of all the process elements except for that having the process element name "SLCPKT" are set to "1", indicating the necessity of description of these process elements.

When the flag 182 is found as set to "1" at the check step 323, the description information 189 (the graphic symbol type 183, symbol name 184 and the comment 185) of the first table record is read out at a step 324. The symbol type information is represented by the code corresponding to the relevant graphic symbol, while the symbol name 184 and the comment 185 are composed of characters to be described inside or outside of the associated graphic symbol. In case the symbol name 184 and comment 185 are fixedly determined independent of the input source program, i.e. unless the input information (INi) 63 is designated by the process element record of the source program (step 325), the content of the description is definitely determined at this time point. Accordingly, the symbol type 183, the symbol name 184 and the comment 185 as well as the process element number 61 included in the first table record mentioned above are placed at the output data area 170A of the memory 170 (step 326). In the output area mentioned above, one graphic symbol for description forms one record.

On the other hand, when the information "(INi)" is included as the comment 185, as in the case of the EQ record shown in FIG. 6, a decision is made at step 325 whether the input information is present (step 325), whereon the input information included in the statement (j) of the source program 12 is sequentially checked at a step 331. Assuming, by way of example, that the statement 122 contains the process element name EQ, it is possible to determine the comment at this time point because the flag of the first input information INi (i=0) is set to "0", indicating the fixed input information. Accordingly, the value of the comment IN0 is converted to the value "0" at a step 332, the result of which is written in the output data area 170B of the memory 170 at a step 326, being followed by a decision step 327 for deciding whether the input information to be converted to the description information 189 remains or not (step 327). Since it is assumed in the case of the illustrated embodiment that the input information IN1 remains to be converted, the steps 325 and 331 are executed repeatedly. The second input information IN1 of the statement 122 is affixed with "1-5" indicating the data input information. In that case, the procedure proceeds from the step 331 to a step 333 where the second table 190 is searched by using as a search key the process element name "SLCPKT" described in the statement 121 having the process element number 1 (=001) in the input source program, whereon the service information designated at the fifth output position "OUT5", i.e. the service information "(IN2)", is read out at the step 333. In case the service information mentioned above is the fixed information, the comment can be determined at this time point. Accordingly, the information INi (where i=1) is converted to the abovementioned fixed information at a step 336, which information is then written in the output data area at a step 336. In this manner, when the service information is the input information IN2, the input information (LIM. LLGI. ATT) is read out which corresponds to the information IN2 described in the abovementioned statement (SLCPKT) 122, being then followed by a decision for deciding whether or not the information is the input information (step 335). In case the statement 122 indicates that the input information corresponding to the abovementioned information IN2 is other data input information expressed by the linkage of the process element number and the output position, the second table is searched with the aid of the name of the process element in which the data originates (step 333). The steps 333 to 335 are repeatedly executed until the fixed information is obtained.

Upon completion of the data conversion described above for all the input information defined in the column "COMMENT" of the first table, linkage information is set at the output data area 177A for linking or interconnecting the process elements by the data lines (step 328). Thereafter, decision is made as to whether or not the abovementioned processing has been completed for all the statements of the source program at a step 329. When statements remain that have not undergone the processing, the steps 310 et seq. are repeated.

FIG. 9 is a view showing a structure of the output data area. In correspondence to each process element, the output data record includes the process element number 201, the linkage information 200, a code 203 indicating the type of the graphic symbol, the symbol name 204 and the comment 205. Further, the output data records for the element indicating the start and the end of the data flow 11 shown in FIG. 2 are also contained in the output data area, although they are omitted in the source list 12 shown in FIG. 3. In each data record, items 201 are obtained from the source list, while items 203 to 205 are derived from the conversion processing performed by using the first table and the second table. The linkage information 200 indicates the identification numbers of the linkage destination process elements to which the "0" output terminal 200A and the "1" output terminal 200B of each process element are to be connected. The linkage information is obtained at the time of addition of new data record to the output data area 170B by setting the process element number of the added new record at the record corresponding to the process element which constitutes the source element generating the input data for the process element defined by the added record.

Figure 10:
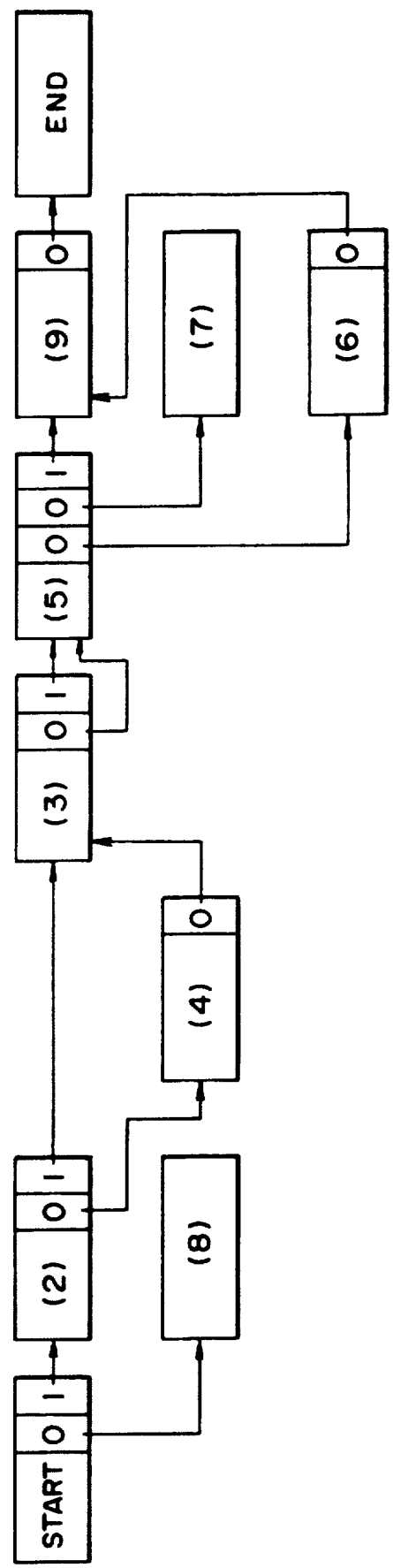
FIG. 10 is a view for illustrating interconnections or linkages among process elements constituting parts of the function design chart.

FIG. 10 is a diagram showing schematically the interconnection relationships among the process elements "START", (2) to (9) and "END" indicated by the linkage information.

The drawing program 179 holds the data for the drawing in correspondence to the individual types of the graphic symbols and operates to print out the function design chart through the printer (e.g. X-Y plotter) 172B on the basis of the description information placed in the output data area 170B. By adopting a so-called two-dimensional disposition method according to which two interconnected (linked) records are described in the longitudinal direction while two records linked to one and the same record are described in the horizontal direction, it is possible to obtain the function design chart shown in FIG. 11 from the output data shown in FIG. 9.

The connecting lines among the graphic symbols shown in the abovementioned function design chart are limited to only the representative or typical data lines which activate the process elements. According to the data flow drive principle according to which any process unit is fired (activated) only when all the input data are completely available, each process element is fired at the time when all the data from the other process elements and the dummy data have arrived at the process element of concern. By way of example, the block (process element) 54 shown in FIG. 2 is fired upon arrival of three data including the output data from the output position or terminals 6 and 7 of the block 51 and the dummy data from the output position 1 of the block 52. Let's consider the sequence in which the blocks (process elements) 51, 52 and 53 are activated. Assuming that the "SLCPKT" block (process element) 51 is first executed, the data from the output position 5 of the block 51 is inputted to the "EQ" block 52. Since the "EQ" block 52 has two inputs one of which is however a fixed value input, the arrival of the input data from the above-mentioned "SLCPKT" block 51 at the "EQ" block 52 satisfies the conditions for execution of the processing. Thus, the "EQ" block 52 is now in the state ready for being fired (activated). On the other hand, the data from the output positions 6 and 7 of the "SLCPKT" block 51 are inputted to the "MSEND" block 54 at the input positions 3 and 4 thereof, respectively. At the instant time point, however, the dummy data from the "EQ" block 52 has not yet arrived. Consequently, the "MSEND" block 54 can not be fired. Only when the processing of the "EQ" block 52 has been executed with the result of the execution being outputted from the output position 1 of that block 52, the "MSEND" block 54 becomes in the state ready for activation (firing). Referring, for example, to FIG. 2, the blocks 52, 53 and 55 each shown in the form of a trapezoid represent the decision making process elements. In these decision making elements, execution of the processing results in the appearance of output data at either one of the two output positions "0" and "1". At the time point of arrival of the dummy data from the "EQ" block 52, all the input data are available for the "MSEND" block 54 at the input positions 0 to 5, respectively. Thus, only the dummy data supplied from the "EQ" block 52 may be considered as constituting the condition for firing or activating the "MSEND" block 54

Figure 12:
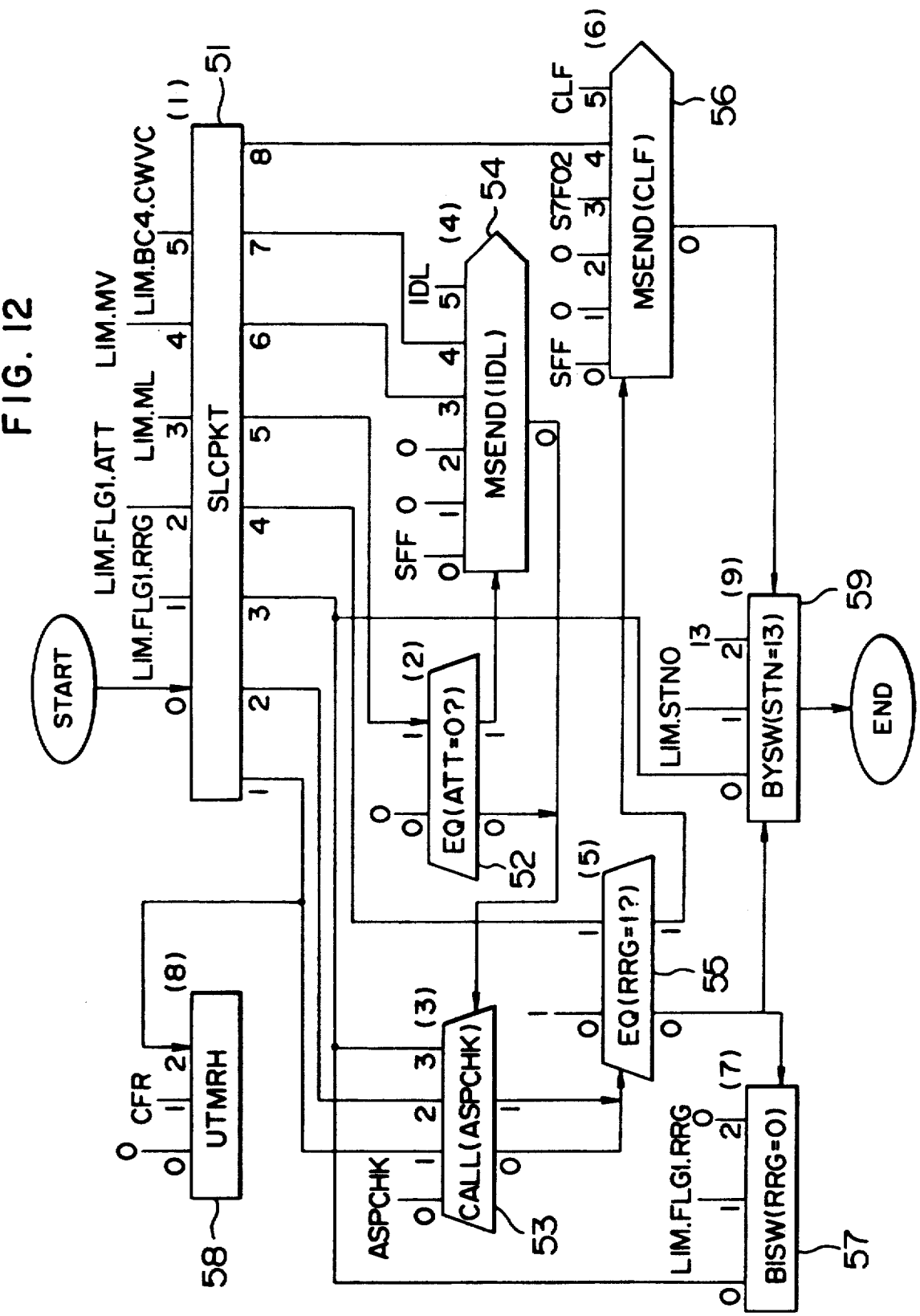
FIG. 12 is a view showing a data flow description chart corresponding to that shown in FIG. 2 in which data for conditioning the activation of the process elements are shown distinctively from other data.

FIG. 12 is a data flow chart corresponding to that shown in FIG. 2 except for the difference in that those data lines which participate in establishing the conditions for activation such as the output data line of the abovementioned "EQ" block 52 are shown in the form of arrow-headed lines with the other data lines being represented by simple lines. Referring to FIG. 12, the blocks (process elements) 53, 55 and 59 are inputted with dummy data from a plurality of process elements, wherein each of the blocks 53, 55 and 59 can be activated upon inputting of any one of the dummy data. Thus, it can be said that in the case of the data flow chart shown in FIG. 12, optimization is realized such that the number of the input data required for activating any one of the process elements is 1 (one).

Assuming that all the data lines among the graphic symbols in the function design chart are to be expressed in the form of link or connecting lines, there arises a problem in respect to ease in understandability as the outline flow chart in view of the fact that a plurality of connecting lines may exist between same blocks. Accordingly, by representing only the data that constitute the condition for activation of the process elements by the connecting lines between the graphic symbols (blocks), as described above, there can be obtained the function design chart enjoying enhanced understandability, because for a major proportion of the process elements, only one input data is sufficient for satisfying the condition for activation thereof.

The data line optimizing program 177 serves for converting the source program list 12 shown in FIG. 2 to the source program list 12' corresponding to the data flow description chart shown in FIG. 12. To this end, the data line optimizing program 177 operates to find out the data input constituting the condition for activation from a plurality of data inputs given to each process element and add a particular mark such as, for example, "=" at the start of the data input constituting the condition for activation on the source program. The data input constituting the condition for activation can be found through a procedure mentioned below by way of example. At first, the statements which are to undergo the decision processing are selected sequentially one by one from the source program, whereon for each of plural input information described in the selected statement, the source or origin process elements in which the information originates, respectively, are found out by tracing back to the past, and when it is found that the information of concern was generated by the source process element as found on the basis of the data input from still another process element, then the source process element in which that data input originates is found by further tracing back to the past. Subsequently, the number of process steps (process elements) participating in the generation of the first mentioned input information is counted. By way of example, in the case of the function design chart shown in FIG. 12, the process element 52 has only one data input which thus realizes the condition for activation of this process element 52. On the other hand, the process element 53 has three input positions 1, 2 and 3. The data inputted to these input positions are all outputted from the process element 51. Accordingly, the number of count is "1" for each of these data inputs. It is further noted that the process element 53 has additionally the dummy data inputs from the process elements 52 and 54 and that the dummy data from the process element 52 is generated in response to the reception of the output data (fifth output data) of the process element 51. Thus, the count value is "2". On the other hand, the dummy data from the process element 54 is governed by the dummy data outputted from the process element 52 the generation of which can be traced back to the process element 51. Thus, the count value is "3". Subsequently, for all the data inputs to the process element under consideration, the count values determined upon reaching the one data source (block 51 in this case) in the tracing-back process are compared with each other to thereby select the data input having the maximum count value as the activating condition input data. In the case of the example now under consideration, the dummy data from the process element 54 is selected as the input data for realizing the condition for activation. However, since the process element 53 can be activated in response to the input of the dummy data from either of the process element 52 or 54, all the dummy data are adopted as the activation conditioning signal.

Figure 11:
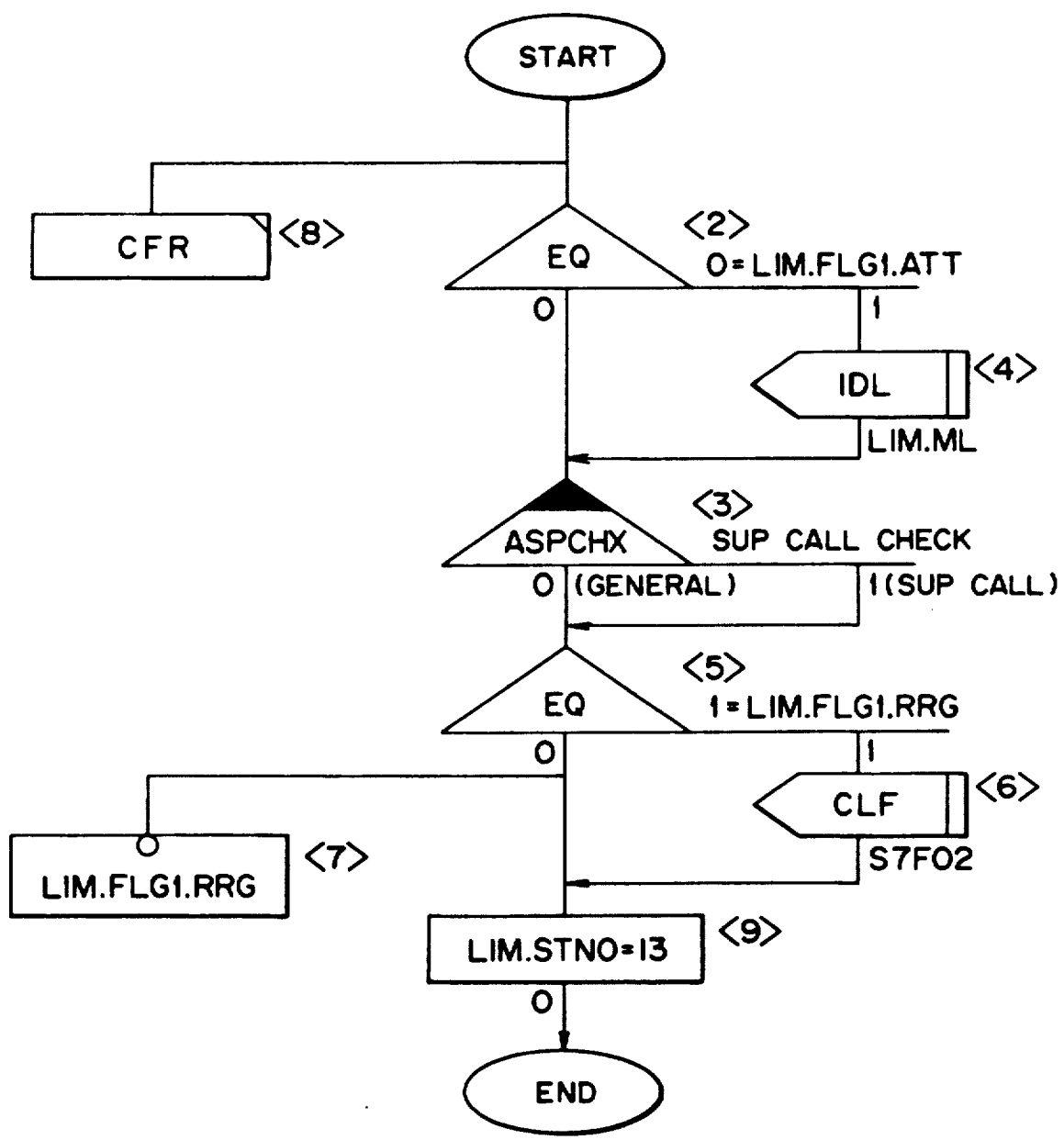
FIG. 11 is a view showing, by way of example, a function design chart obtained according to the invention.

As will be appreciated from the foregoing, selection of the activation conditioning data line is realized by comparing repetitively for every statement included in the source list at the time when all the input information have been traced back to one and the same process element. By selecting previously the data lines as the object for description in this manner, the statements analyzing program may simply select only those data inputs which are affixed with the particular mark such as, for example, "=" in the source list upon setting the linkage information in the output buffer. FIG. 11 shows interconnections or linkages among the graphic symbols (blocks) resulting from the procedure described above applied to the data flow chart shown in FIG. 12.

Figure 13:
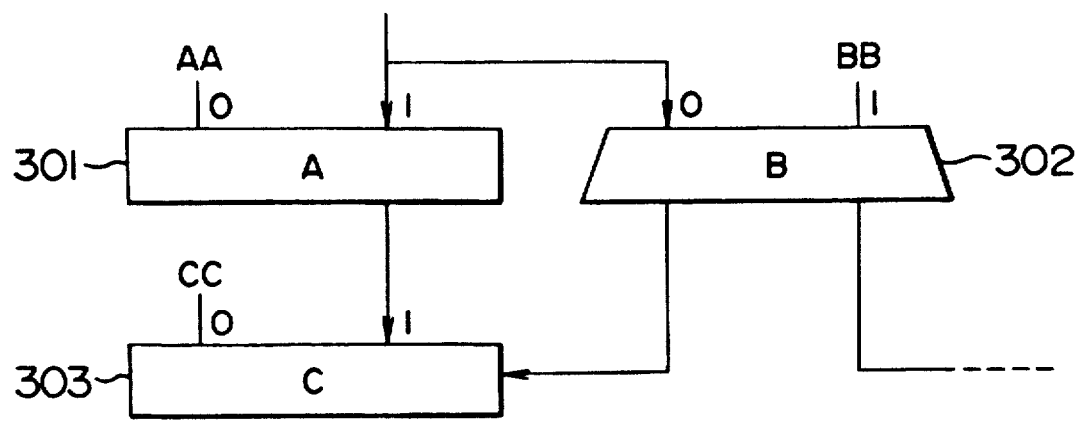
FIG. 13 is a view showing a portion of a particular data flow description chart.
Figure 14:
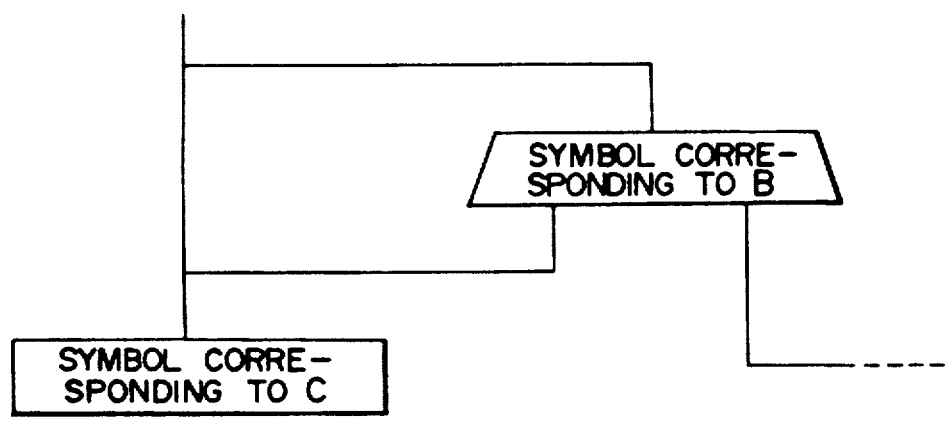
FIGS. 14 and 15 are views showing function design charts obtained from the flow description chart shown in FIG. 13 according to other embodiments of the present invention, respectively.

In the above description, it has been assumed that the number of the data input required for activation of the process element is "1" (one). In general, there exist such cases where a plurality of data inputs are required for activation of the process element. By way of example, reference may be made to FIG. 13. In the case of the example shown in this figure, it can not be assured which of the data from a block 301 (process element A) inputted to a block 303 (process element C) at the input position 1 and the data from a block 301 (process element A) inputted to the block 303 as the dummy data is first inputted. In this case, both of the input data are handled as the activation conditioning input data. Assuming, for example, that the process element A need not be described while the process elements B and C are the objects for description according to the first description rule, then the flow chart shown in FIG. 13 is translated to the chart shown in FIG. 14 when the interconnection description procedure described hereinbefore is applied. Under the circumstance, when there exist a plurality of activation conditioning data and that the data includes the dummy data, it is proposed according to another aspect of the invention that only the interconnection line corresponding to the dummy input is to be drawn. In that case, the graphic symbols are interconnected only by a single line. It should however be mentioned that when a plurality of activation conditioning data input exist and include no dummy data, there are drawn a plurality of interconnection lines between the graphic symbols (blocks).

Figure 15:
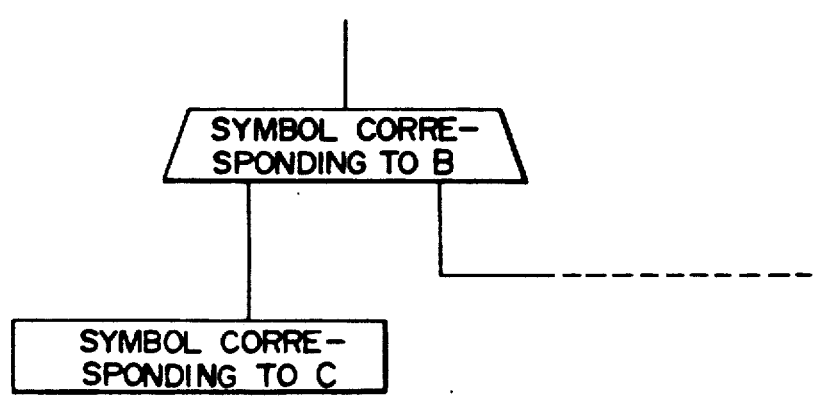
Figure 16:
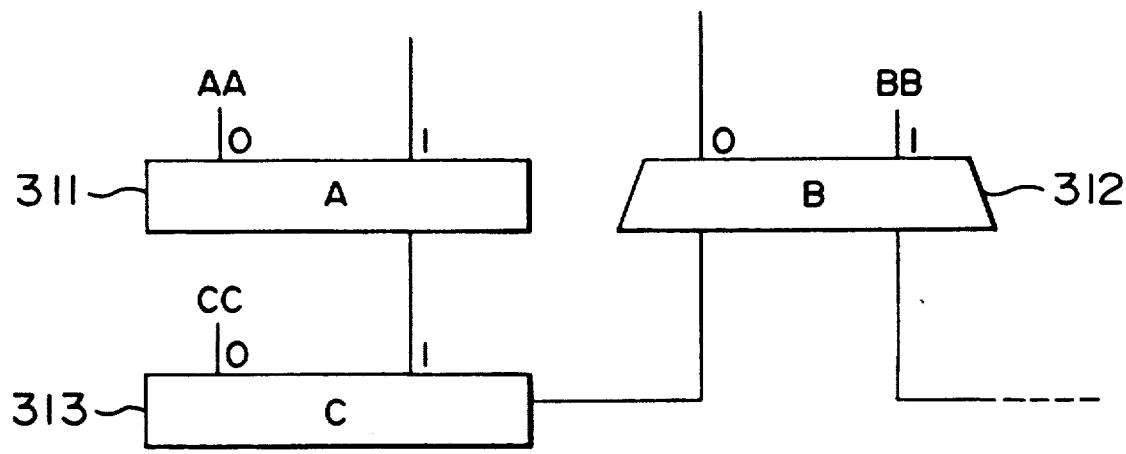
FIGS. 16 and 17 show a data flow description chart and a function design chart, respectively, for explaining a further embodiment of the present invention.
Figure 17:
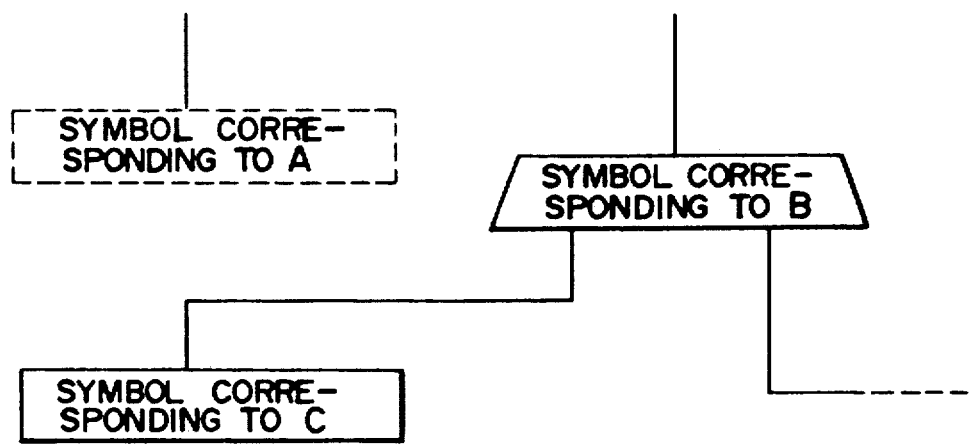
Figures 18, 19:
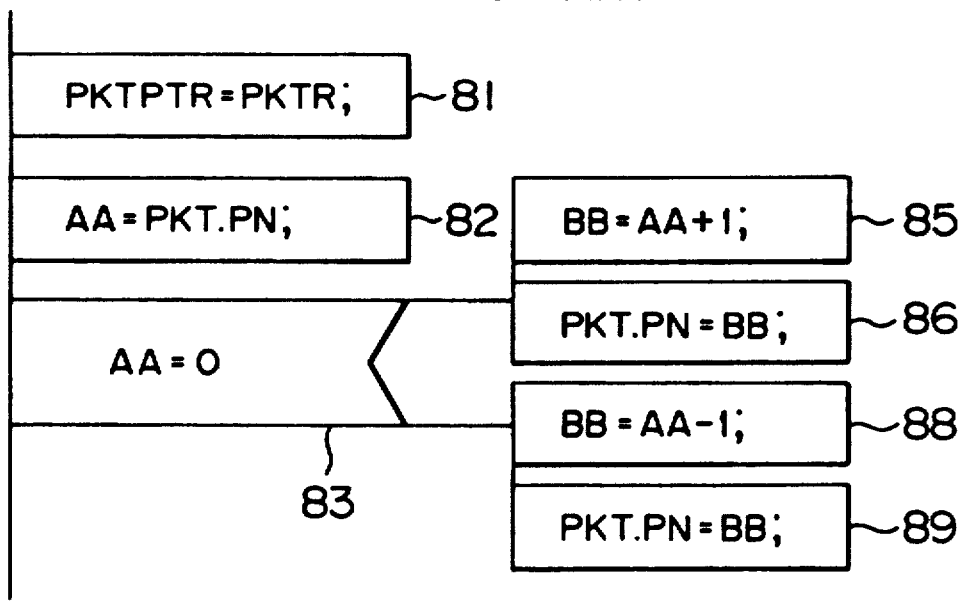
FIG. 18 is a view showing an example of a source program list described in a procedure language PL/I.
FIG. 19 shows a PAD diagram corresponding to the source list shown in FIG. 18 as obtained by a prior art method.
Figure 20:
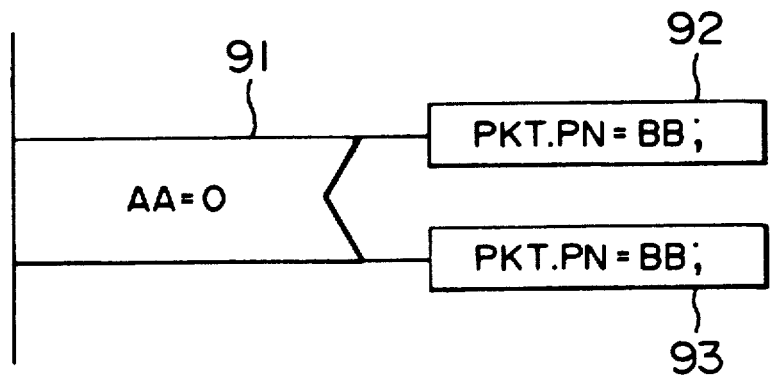
FIGS. 20 and 21 are views showing, respectively, function design charts corresponding to the PAD diagram shown in FIG. 19.
Figure 21:
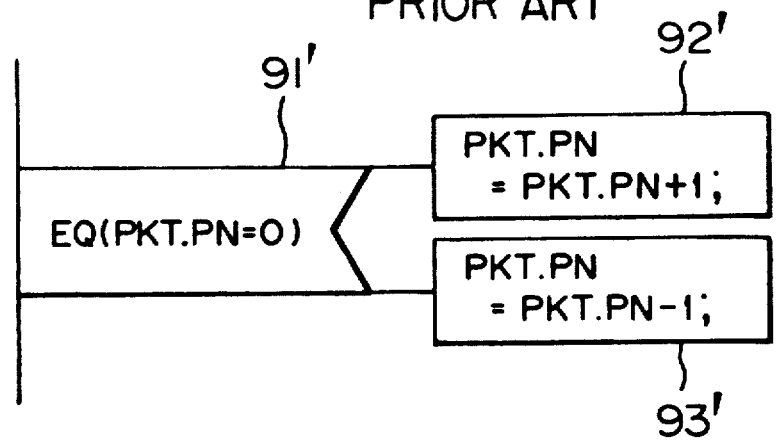

In this conjunction, there may arise such a data flow description as shown in FIG. 16 in which upon conversion of the function design chart, the process element A need not be described with only the process elements B and C being required to be described, application of the procedure described above by referring to FIGS. 13, 14 and 15 will result in such a function design chart as shown in FIG. 17 (where only the data inputs represented by the arrow-headed lines are the object for the description). Referring to FIG. 17, the line corresponding to the input data to the process element can not reach any graphic symbol (block) and remains in a floating state, so to say, because any description is unnecessary for the process element A. To evade such situation, it is proposed according to another aspect of the invention to add to the function design chart generating system such algorithm that for the data line reaching none of the process elements to be described, the process element in which that data originates is also deleted from the function design chart.

In the foregoing description of the embodiments of the invention, it has been assumed that the records each including the flag information and the description information are provided in the first description rule table for all the types of process elements used in the data flow chart. It should however be appreciated that only the records for the process elements to be the object for the description on the function design chart can be stored in the first rule table, to thereby allow the process elements not registered in the table to be decided as the elements which need not be described on the function design chart to be generated.

As will now be appreciated from the foregoing, it is possible according to the teaching of the present invention to implement a bottom-up type tool for automatically converting a data flow description of the source program level into a function design chart showing an outline of the function, whereby productivity of the software design can be significantly enhanced at the stage of preparing the source program. At the present state of the art, the flow of software design includes system examination, function design, creation of source program, filing and debug in this sequence, wherein at the stage of the debug the source program is modified directly, presenting thus a problem of impossibility of ensuring maintenance for the function design chart of the higher level, which problem can successfully be solved according to the present invention which allows the function design chart to be automatically created without need for manual intervention of the operator.

Besides, according to the invention, there can be obtained a function design chart assuring an enhanced understandability by virtue of the numbering corresponding to the source program, simplification of interconnections among the graphic symbols to be described and others.

We claim:

1. A method of generating a function design chart showing an outline of a data flow description chart with the aid of a computer from a source program corresponding to said data flow description chart which contains a plurality of process elements each receiving a plurality of inputs representing fixed values or variable data and outputting at least one data in accordance with the result of processing and data lines for interconnecting said process elements, the method comprising the steps of:

inputting said source program to said computer, said source program including a plurality of statements corresponding to said process elements, each of said statements defining a name of the corresponding process element and a plurality of input information to be inputted to said process element and described in the order of input positions of said process element, said input information being represented by data indicating an output position of other process elements when said input information is furnished from said other process element;

selecting process elements to be an object for description of a function design chart by sequentially collating said name of said process element contained in each statement of said plurality of statements of said source program with a first description rule table stored previously in said computer, said first description rule table containing definitions concerning types of graphic symbols to be displayed in said function design chart and comment information corresponding to said names of said process elements for plural types of said process elements constituting said objects for description of said function design chart, said comment information representing position data indicating input positions of said input information to the associated process element;

generating an output record containing a type of graphic symbol and said comment information as defined in said first description rule table for each of said process elements selected to be objects for description of said function design chart by said selecting step;

detecting position data contained as said comment information in said output record and replacing each of said position data by input information specified by said position data described in said statement from said plurality of statements of said source program which corresponds to said output record;

referencing a second description rule table stored previously in said computer to thereby replace said position data by predetermined input information when said input information to replace the position data at said detecting step is described in said statement of said source program in a form of said position data of other process elements, said second description rule table storing said position data of an individual process element from said plurality of process elements in the form of numerical values, names of variables or said input position data for said input information from the other process elements in the order of the output positions for the plural types of said process elements;

adding linkage information to said output record, said linkage information indicates an interconnection relation between said process element defined by said output record and said process element defined by another output record based on the content of said statements of said source program; and drawing said function design chart on the basis of said output records.

2. A method of generating a function design chart according to claim 1, wherein said referencing step further includes:

reading out one output data from said second description rule table specified by said output position data of other process element described in said input source program, and replacing said output position data as the said comment information by said output data read out from said second description rule table, when said output data read out represents a numerical value or names of a variable;

wherein when said output data read out from said second description rule table is stored in the form of information input position data from still another process element, said detecting step is executed for said position data.

3. A method of generating a function design chart according to claim 1, wherein at said adding step, said linkage information is prepared for particular inputs governing activation of the process element among the plurality of the inputs to each process element.

* * * * *